Patented Mar. 9, 1954

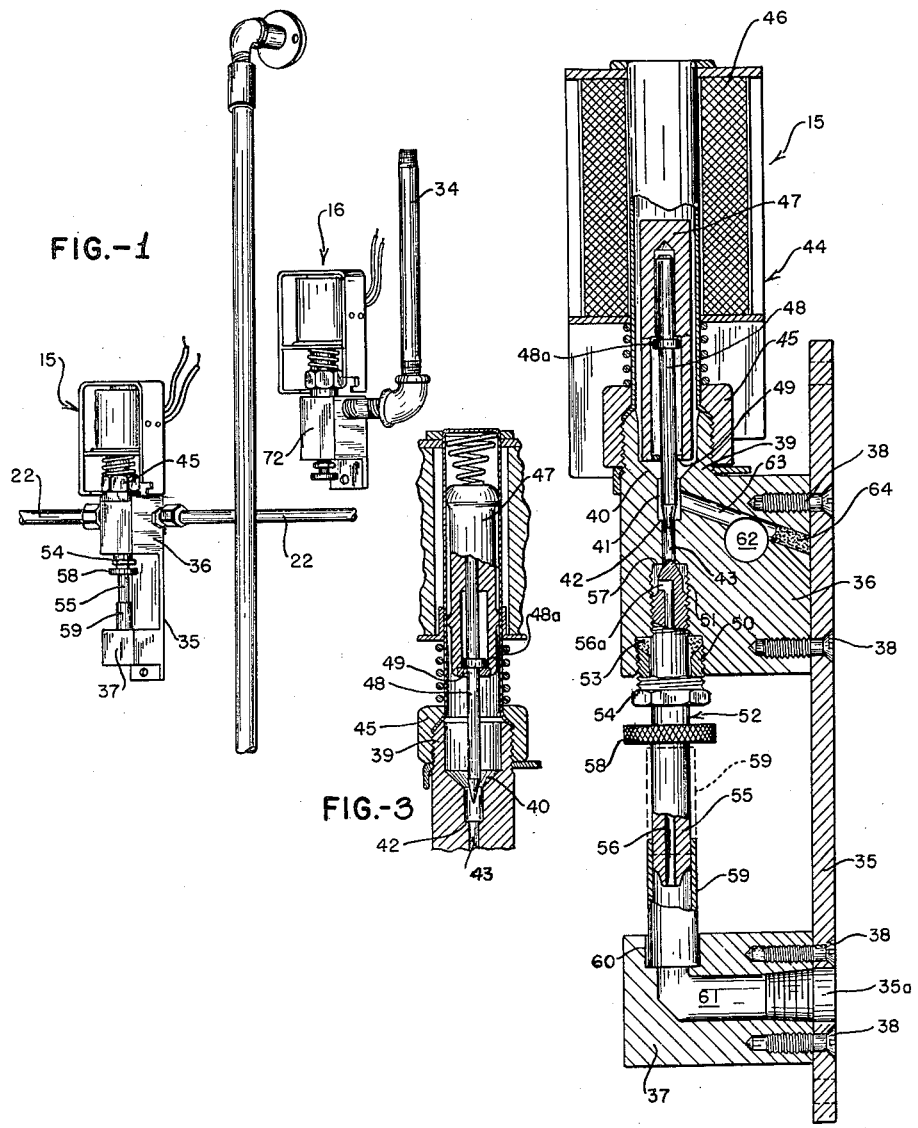

2,671,467

UNITED STATES PATENT OFFICE 2,671,467

SOLENOID OPERATED VALVE ASSEMBLY

Bernard L. Rosenberg, Denver, Colo., assignor to Robbins Incubator Co., Denver, Colo., a corporation of Colorado Application June 15, 1949, Serial No. 99,272

2 Claims. (Cl. 137—559)

1

The present invention relates to a solenoid operated valve assembly. It has to do particularly with automatic valves used in conjunction with incubators for the purpose of automatically controlling both the humidity in the incubator compartment and the temperature within that compartment. The proper control of humidity and the proper control of temperature are absolutely essential to effect successful hatching in commercial poultry incubators. Inasmuch as the incubation process is one that continues twenty-four hours a day, day after day, it is important that automatic means which are efficient and virtually fool-proof be provided for maintaining the proper degrees of humidity and temperature within the incubator at all times. The use of cooling means is very important for the reason that often incubators are installed in climates wherein the normal ambient temperature is sometimes higher than the temperature required to properly incubate eggs. In such localities, the water cooling means must be resorted to to maintain the proper temperature within the incubator compartment and forms a more important feature of the equipment than where the incubator is installed in localities having moderate climatic conditions.

Inasmuch as incubators with which the present invention is employed often have a plurality of incubating compartments or sections and one or more hatching compartments or sections, a battery of both humidification and temperature control valves are provided on the back wall of the incubator cabinet, there being one of each of said valves for each of the compartments. The several humidity control valves are usually supplied with water from a common tank located outside the incubator and preferably mounted upon its rear wall, which water is filtered and passes through pipe lines or tubing to the several humidification valve assemblies. For this reason, particular types of valves must be employed because of the necessity to provide the valve bodies with by-pass passageways so that water fed to them is not only carried through to the unit with which that particular valve is connected but must pass on to the next valve assembly without any interference with the flow of the water. With previously known valves of this general character, the structure has been such as to prohibit the use of any by-pass passageway through the valve body. As a result, a surplus of pipe connections was necessary and in some instances, because of the known valve failure to meet the problem, some of the connections had to

2 be placed on the inner walls of the compartments of the incubator cabinet. This was objectionable for the reason that it is highly desirable to have the interior of the compartments as free as possible of equipment.

One of the objects of the present invention is to provide an improved solenoid operated humidity water metering valve and an improved temperature water cooling metering valve of precision-machined character which are particularly well adapted for use in conjunction with conventional commercial solenoids, whereby a precise control of the quantity of water passing through the valves to the units in the incubator is possible.

Another object of the present invention is to provide an improved humidity control valve which is automatic in its operations and which has means permitting the flow of water through the valve to be observed by the operator, and in which the means permitting the observation of the flow also serves to maintain the circuit closed and thus prevent the accumulation of foreign matter, such as lint, in the water passageways or assembly.

Another object of the present invention is to provide an improved automatic valve of the foregoing character either for humidity or temperature control, in which automatic means is provided for permitting the flow of water through the valve to the unit to which it is attached, and wherein manually controlled valve means is combined with the automatic valve means to permit the manual control or metering of the water which passes through the valve assembly.

A further object of the present invention is to provide an improved type of solenoid operated humidity control valve in which the water passage between the water inlet in the vicinity of the solenoid pin valve seat and the outlet passage in the lower portion of the valve body, is substantially straight, thus permitting constant cleaning of the passageway in use.

Another object of the present invention is to provide improved mounting means or plates for the valve assemblies which permit the attachment of the valve assemblies to the outer rear wall of an incubator cabinet, or in other places, if desired.

Another and important object of the present invention is to provide an improved pair of valve assemblies for each compartment of an incubator, one for controlling humidity within the compartment and the other for controlling temperature by cooling within that compartment, in which the valves operate entirely automatically and in which each of the valve assemblies includes a manually controlled metering valve for regulating the quantity of water which passes through the assembly.

The foregoing and other objects and advantages of the present invention will appear from the following description and appended claims when considered in connection with the accompanying drawings forming a part of this specification wherein like reference characters designate corresponding parts in the several views.

In said drawings:

Fig. 1 is a perspective view of a pair of valves embodying the present invention and consisting of the humidity control valve and the temperature control valve for a single incubating compartment of an incubator;

Fig. 2 is a vertical sectional view, on an enlarged scale, of one of the humidity control valves embodying the present invention, showing the solenoid operated pin valve on its seat and the manually controlled metering valve also seated;

Fig. 3 is a fragmentary vertical sectional view, partly in elevation, illustrating the solenoid pin valve elevated from its seat by the action of the coil and floating core.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

The particular valves embodying the present invention are shown in detail in Figs. 1, 2, 3, of the drawings. In Fig. 1, the humidity control valve 15 for compartment B is shown, along with its companion temperature controlling valve 16 for this compartment. This view is intended to show the respective positions of the valve assemblies as applied to the rear wall of an incubator cabinet, not shown. Valve 16 is supplied with water through a pipe line 34 from a main service line, as will be explained below and it will be understood that water from a tank, not shown, enters humidity control valve 15 at the left side of the valve body through pipe 22, a portion of this water being by-passed through the body and into the pipe extension 22 at the right of valve assembly 15 whence it flows into the next humidity control valve 17.

One embodiment of the humidity control valve of the present invention is shown in detail in Figs. 2 and 3. With special reference to these figures, the humidity control valve assembly, shown as a whole at 15, comprises a base or mounting plate 35 carrying adjacent its upper end a valve body portion 36 and adjacent its lower end an auxiliary or second valve body portion 37. The body portions 36 and 37 are preferably secured to the mounting plate by screws 38 or the like to make a rigid unit.

The main body portion 36 is provided with an externally threaded upwardly extending nipple 39 providing a portion 40 and extending into a passageway 41, a solenoid pin valve seat 42 and a passageway 43, all of which are in communication when the solenoid pin valve, described below, is not on its seat. A solenoid assembly, shown as a whole at 44, is mounted upon the threaded nipple or boss 39 and held thereto by a threaded collar or nut 45. The solenoid assembly is of conventional construction and includes an electrically energized coil 46 having a cylindrical chamber therein in which is located a floating core 47 which carries a solenoid pin valve 48, said valve being adapted to normally engage seat 42 when the coil is de-energized. The lower end of the floating core 47 carries an internal ring or washer 49 adapted to engage an angular rib or projection 48a on valve stem of valve 48 when the core is elevated by energizing the coil 46. When so energized, the core is attracted upwardly and removes valve 48 from its seat.

The lower end of main valve body 36 is drilled to provide a recess or socket 50 and a connecting smaller diameter recess or passage 51 which is in communication with passage 43. A manually controlled metering valve, shown as a whole at 52, is threaded into the narrow passageway 51 and is surrounded by a suitable packing 53 forced into compressed condition by a packing nut 54. The stem 55 of the metering valve 52 is elongated and extends downwardly toward the lower or auxiliary body 37. This valve stem is provided with a longitudinal passageway 56 having its intake upper end portion disposed laterally with respect to the valve, as indicated at 56a. It will be seen that the tapered head or valve 52 is adapted to engage seat 57.

The valve stem 55 is provided intermediate its upper and lower ends with a knurled knob 58 for the purpose of rotating the valve stem manually and adjusting the valve relative to its seat 57. The lower end of valve stem 55 carries a slidable metal sleeve member 59 which normally finds a seat in a socket or recess 60 formed in the top portion of auxiliary body 37. Body 37 is provided with a substantially L-shaped passageway 61 which communicates with an opening 35a formed in mounting plate 35. It will be understood that when the solenoid is energized to raise the valve pin 48 off its seat 42 and the metering valve 52 is manually adjusted to remove it from its seat 57, outlet passageway 61 in body 37 will be in communication with portion 40, above referred to, and disposed immediately below the floating core 47 of the solenoid assembly. The slidable sleeve 59 performs two functions. When in its full line or lowered position, it affords a closed passageway or conduit between passage 56 and water outlet passage 61 and thus keeps foreign particles, such as lint, which is often present in great quantities in an incubator, from entering the water stream and tending to clog the parts. It serves the other function of permitting an inspection by the operator of the water flow downwardly through passage 56 and into outlet passage 61. This inspection may be accomplished by raising the sleeve upwardly on the stem 55 to its broken line position as seen in Fig. 2. If an insufficient quantity of water is flowing through the passageways, the knurled portion 58 is engaged and rotated in a counter-clockwise direction to remove the metering valve 52 farther away from its seat 57, thus increasing the flow of water. If the quantity is too great, the knurled portion 58 is turned in the opposite or clockwise direction to move the head of the valve 52 toward its seat 57, thus cutting down the quantity of water passing through the valve assembly.

The body portion 36 of the valve assembly is provided with a transverse drilled opening or bore 62 which extends from one side wall of the body all the way through to the other side wall, thus providing a by-pass passageway for by-passing water entering at one side through pipe 22 to the pipe section 22 on the opposite side, as indicated in Fig. 1. A portion of the water entering by-pass 62 serves as the incoming water for valve assembly 15. For the purpose of directing water into chamber or space 41, an upwardly inclined passageway 63 is drilled in the body portion 36 and intersects the by-pass 62, as seen in Fig. 2. This passageway 63 extends inwardly and upwardly from the back wall of body 36 into the space or chamber 41 surrounding solenoid pin valve and conducts a portion of water from by-pass 62 into passageway or space 41. The lower end of passageway 63 is closed adjacent mounting plate 35 by means of a gob of sealing material 64 to make a fluid tight joint between the lower end of passageway 63 and said plate.

In operation, when the humidistat within a compartment of an incubator functions to call for greater humidity within the compartment, the coil 46 of the solenoid assembly is immediately energized, raising the core 47 and lifting the solenoid pin valve 48 off its seat to allow water from passageway 63 to pass beyond the tip of valve 52, through the passageway 56 in its stem and out through outlet passage 61 in the lower or auxiliary body 37 whence the water, through suitable connections and fittings (not shown) passes into the humidifying device, not shown. While the flow of water past valve 48 is automatically controlled, the quantity of water which passes through outlet passage 61 is regulated or metered manually by means of the metering valve 52. Thus, a mere trickle only of water may be allowed to pass through the valve assembly and into the humidifying unit of the incubator compartment, or metering valve 52 may be backed sufficiently away from its seat 57 to allow a large stream or flow of water to pass through the valve assembly. By having such a wide range of manually controlled adjustments for the metering of the water, a large stream may be caused to flow through the parts to clean the same. Moreover, in normal operation and by aligning the ports or passageways as shown in Fig. 2, the device is constantly self-cleaning because of the downward flow.

I claim:

1. In a solenoid operated valve assembly for supplying predetermined quantities of water from a source of water supply to a compartment or compartments of an incubator for humidifying or air cooling purposes, a valve body having a solenoid pin valve seat formed therein and a metering valve seat also formed therein below the pin valve seat and in communication therewith, said valve body being mounted upon a mounting plate extending below said body, a second valve body portion carried by the mounting plate below the first body portion, a solenoid assembly mounted on the top portion of the main valve body including a floating core carrying a pin valve adapted to seat downwardly on the pin valve seat, a metering valve having a partially threaded stem threaded into the lower portion of the main valve body below the solenoid pin valve and adapted to seat upwardly on the metering valve seat, packing and a packing nut surrounding the valve stem and disposed in a threaded recess in the valve body, means carried by the valve stem intermediate its ends for moving the metering valve toward and away from its seat, said metering valve stem having a passageway extending therethrough and provided with a side inlet opening adjacent its upper end, said second valve body portion having an opening in its upper surface communicating with a passage extending to the back wall thereof, said opening providing a seat, and a slidable sleeve mounted upon the metering valve stem extension below its actuating means adapted to seat in said second body portion to direct water passing through the metering valve stem into the outlet passage of the second body portion, said sleeve being adapted to be elevated from its seat to permit inspection of the flow of water from the metering valve stem into the outlet passage of the second body portion, said main valve body portion having a transverse by-pass water passageway extending from one side wall to the opposite side wall thereof, and an upwardly inclined passage communicating with the by-pass passageway and with the solenoid pin valve seat for providing water to the valve assembly.

2. In a solenoid operated valve assembly for supplying predetermined quantities of water from a source of water supply to a compartment or compartments of an incubator for humidifying or air cooling purposes, said valve assembly including a body, a solenoid pin valve seating downwardly in a tapered solenoid pin valve seat in the body and a water metering valve having a stem provided with a longitudinal water passage seating upwardly against a water metering valve seat disposed below and in communication with the pin valve seat, whereby upon energizing the coil of the solenoid, the solenoid pin valve will be lifted from its seat to permit the passage of water from a source of supply past the metering valve, said valve assembly also including a second body spaced from the first valve body, and a slidable sleeve connecting the metering valve stem and the second body to continue the outlet passage for water through the assembly, said slidable sleeve being capable of being shifted upwardly into open position to permit the flow of water to be inspected.

BERNARD L. ROSENBERG.

References Cited in the file of this patent

UNITED STATES PATENTS

| Number | Name | Date |
| --- | --- | --- |
| 724,528 | Waterman | Apr. 7, 1903 |
| 1,150,562 | Vose | Aug. 17, 1915 |
| 1,295,387 | Thornbery et al. | Feb. 25, 1919 |
| 1,550,422 | Braemer | Aug. 18, 1925 |
| 1,584,154 | Treffer | May 11, 1926 |
| 1,587,921 | Ray | June 8, 1926 |
| 2,223,986 | Eaton | Dec. 3, 1940 |
| 2,309,411 | Miller | Jan. 26, 1943 |
| 2,315,517 | Greenlee et al. | Apr. 6, 1943 |
| 2,334,865 | Crawford | Nov. 23, 1943 |
| 2,383,811 | Miller | Aug. 28, 1945 |